(12) United States Patent
Tsai et al.

(10) Patent No.: US 9,628,148 B2
(45) Date of Patent: Apr. 18, 2017

(54) ELECTRONIC DEVICE WITH MODULIZATION PARTS

(71) Applicant: Quanta Computer Inc., Taoyuan (TW)

(72) Inventors: Sheng-An Tsai, Taoyuan (TW);
Lu-Lung Tsao, Taipei County (TW);
Yu-Yen Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 14 days.

(21) Appl. No.: 14/859,446

(22) Filed: Sep. 21, 2015

(65) Prior Publication Data
US 2016/0134335 A1 May 12, 2016

(30) Foreign Application Priority Data

Nov. 10, 2014 (TW) .............................. 103219869 U (51) Int. Cl.
| | |
|---|---|
| *H04B 5/00* | (2006.01) |
| *H02J 50/05* | (2016.01) |
| *H02J 5/00* | (2016.01) |

(52) U.S. Cl.
CPC .............. *H04B 5/0037* (2013.01); *H02J 5/00* (2013.01); *H02J 50/05* (2016.02); *H04B 5/0012* (2013.01); *H02J 5/005* (2013.01)

(58) Field of Classification Search
CPC ....... H04B 5/0012; H04B 5/0037; H02J 5/00; H02J 5/005; H02J 50/05
See application file for complete search history.

(56) References Cited

U.S. PATENT DOCUMENTS

| 9,318,898 B2* | 4/2016 | John | H02J 5/005 |
| 9,318,899 B2* | 4/2016 | Yoon | H02J 7/00 |
| 2011/0101788 A1* | 5/2011 | Sun | H01F 38/14 |
| | | | 307/104 |
| 2011/0316475 A1* | 12/2011 | Jung | H02J 7/025 |
| | | | 320/108 |
| 2014/0187151 A1* | 7/2014 | Cieslak | H04B 5/0012 |
| | | | 455/41.1 |
| 2014/0346889 A1* | 11/2014 | Abe | H02J 5/005 |
| | | | 307/104 |
| 2015/0044966 A1* | 2/2015 | Shultz | H04B 5/0012 |
| | | | 455/41.1 |
| 2015/0137623 A1* | 5/2015 | Shirasaka | H02J 17/00 |
| | | | 307/149 |

(Continued)

*Primary Examiner* — Zachary M Pape
*Assistant Examiner* — Douglas Burtner
(74) *Attorney, Agent, or Firm* — McClure, Qualey & Rodack, LLP (57) ABSTRACT

An electronic device with modulization parts includes a first main body, a first wireless transmission port having a first circuit board and a first induction pad, a second main body detachably coupled to the first main body, and a second wireless transmission port having a second circuit board, a second induction pad, an induction cap and an elastic conductive member electrically conducted to the second induction pad and the induction cap. The first circuit board is disposed on the first main body. The first induction pad is electrically connected to the first circuit board. The second circuit board is disposed on the second main body. The elastic conductive member physically supports the induction cap so that the first induction pad induces the second induction pad through the induction cap.

8 Claims, 8 Drawing Sheets

(56) References Cited

U.S. PATENT DOCUMENTS

| | | | |
|---|---|---|---|
| 2015/0249346 A1* | 9/2015 | Shinoda | H02J 5/005 307/104 |
| 2015/0263536 A1* | 9/2015 | Niizuma | B60L 11/1829 307/104 |
| 2015/0349578 A1* | 12/2015 | Hu | H02J 7/0042 320/108 |
| 2015/0364861 A1* | 12/2015 | Lucke | A61M 1/1008 439/271 |
| 2016/0043569 A1* | 2/2016 | Dally | H01F 27/24 307/104 |
| 2016/0056587 A1* | 2/2016 | Eremenko | H01R 13/665 439/38 |
| 2016/0175590 A1* | 6/2016 | Kulkarni | A61N 1/375 607/57 |

\* cited by examiner

ELECTRONIC DEVICE WITH MODULIZATION PARTS

RELATED APPLICATIONS

This application claims priority to Taiwan Application Serial Number 103219869, filed Nov. 10, 2014, which is herein incorporated by reference.

BACKGROUND

Field of Disclosure

The present disclosure relates to an electronic device. More particularly, the present disclosure relates to an electronic device with modulization parts.

Description of Related Art

Generally, electronic devices are mostly developed towards modulization designs on the configurations of the electronic devices. A module can be optimized so that the optimized module is removably engage with a main body of one of the electronic device, and can exchange signals with the main body of the electronic device. For example, the main body of the electronic device is engaged with the optimized module, so that the optimized module and the main body of the electronic device are capacitively coupled to exchange signals with each other without physically contacting.

Although the optimized module and the main body of the electronic device are not physically contacted, a gap existing between the main body and the optimized module must be less than an effective induction distance for establishing capacitive coupling between the main body and the optimized module. However, because the gap existing between the main body and the optimized module must comply with the aforementioned effective induction distance, and an excessive allowable tolerance of dimensions is not allowed in the production of the main body and the optimized module. Additional processing costs and labor costs may be required to precisely produce the main body and the optimized module of the electronic device.

Therefore, how to provide a solution to effectively solve the aforementioned inconvenience and shortages and to increase the competitiveness of industries shall be seriously concerned.

SUMMARY

The present disclosure is to provide an electronic device with modulization parts to overcome the defects and inconvenience of the prior art, that is, the gap existing between the main body and the optimized module can comply with the aforementioned effective induction distance without additional processing costs and labor costs.

For achieving the aforementioned objection, according to one embodiment, the electronic device with modulization parts includes a first main body, a first wireless transmission port, a second main body, and a second wireless transmission port. The first wireless transmission port includes a first circuit board and at least one first induction pad. The first circuit board is disposed on the first main body. The first induction pad is electrically connected to the first circuit board. The second main body is detachably coupled to the first main body. The second wireless transmission port includes a second circuit board, at least one second induction pad, at least one induction cap, and at least one elastic conductive member. The elastic conductive member is electrically conducted to the second induction pad and the induction cap. Thus, when the first main body is coupled to the second main body, and the first wireless transmission port aligns with the second wireless transmission port, since the elastic conductive member physically supports the induction cap, the first induction pad is allowed to induce the second induction pad through the induction cap so as to improve the quality of signal.

In one or more optionally embodiments, the first wireless transmission port further includes a partition board. The partition board is disposed on the first circuit board, and the partition board includes at least one first penetrating hole. The first induction pad is received and depressed in the first penetrating hole.

In one or more optionally embodiments, the second wireless transmission port further includes a frame and a floatable platform. The frame is fixedly disposed on the second main body, and the frame includes an opening exposing the second induction pad. The floatable platform is elevatably disposed in the opening, and the floatable platform includes at least one second penetrating hole. The induction cap is received and depressed in the second penetrating hole.

In one or more optionally embodiments, the first penetrating hole includes a first depth, and the first induction pad includes a first thickness less than the first depth. The second penetrating hole includes a second depth, and the induction cap includes a second thickness less than the second depth.

In one or more optionally embodiments, the floatable platform includes a top surface and a guiding surface. The top surface is used for contacting with the partition board. The guiding surface is connected to the top surface for guiding the first main body to reach the top surface.

In one or more optionally embodiments, when the first wireless transmission port aligns with the second wireless transmission port, a perpendicular orthographic of the first induction pad towards the floatable platform is at least partially overlapped with the induction cap.

In one or more optionally embodiments, the elastic conductive member is a retractable spring, and two opposite ends of the retractable spring respectively connect to the second induction pad and the induction cap.

In one or more optionally embodiments, the elastic conductive member is a flat-arm metal spring, and two opposite ends of the flat-arm metal spring respectively connect to the second main body and the induction cap.

Therefore, no matter whether an excessive allowable tolerance exists between the first induction pad and second induction pad, however, as the electronic device of the present disclosure arranges the induction cap to be intermediate between the first induction pad and the second induction pad, the effective induction distance between the first induction pad and the second induction pad can be decreased so as to improve the quality of signals of the first induction pad and the second induction pad.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the disclosure.

Figure 1:
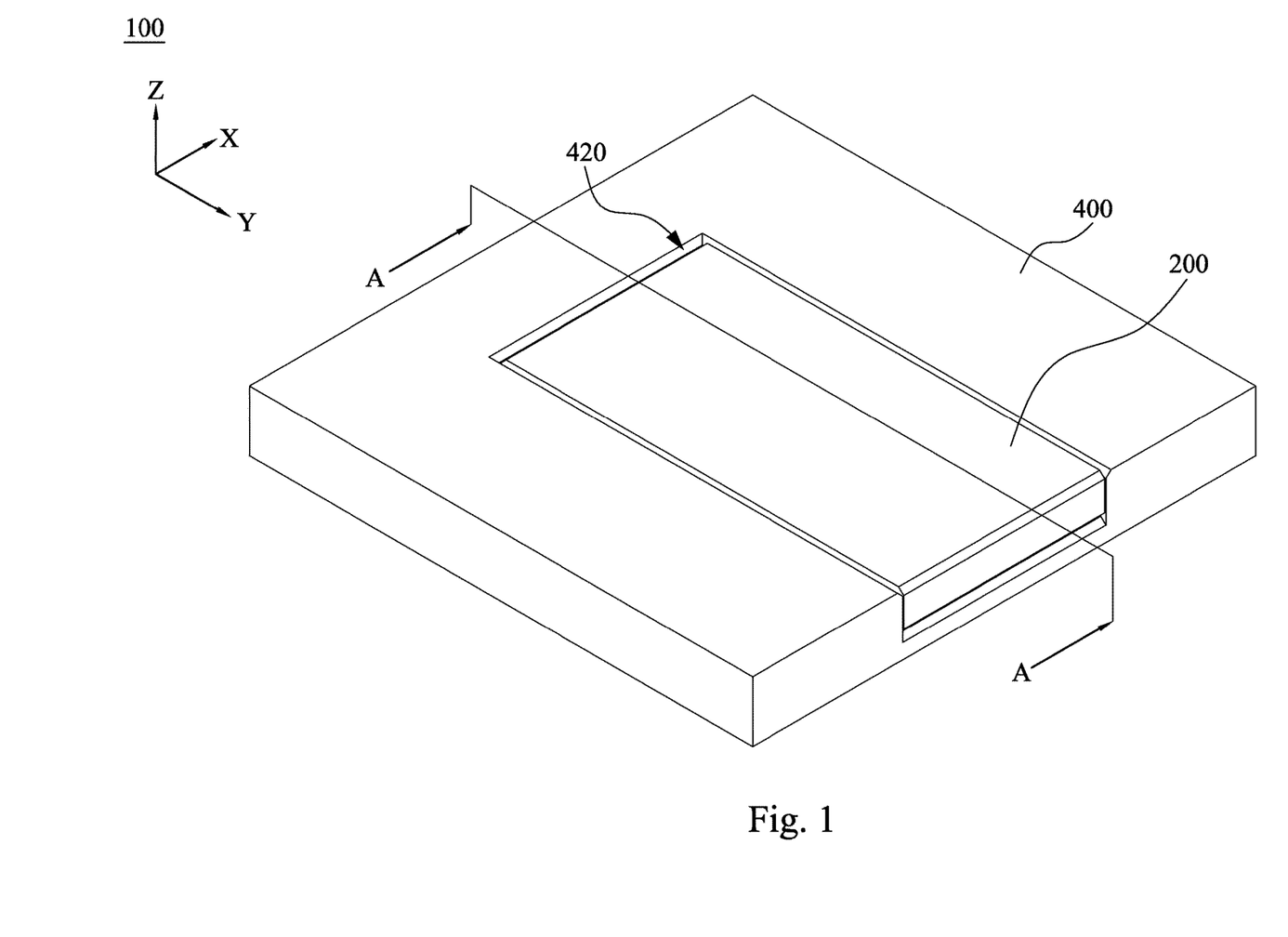
FIG. 1 is a perspective view of an electronic device with modulization parts according to an embodiment of this disclosure.
Figure 2:
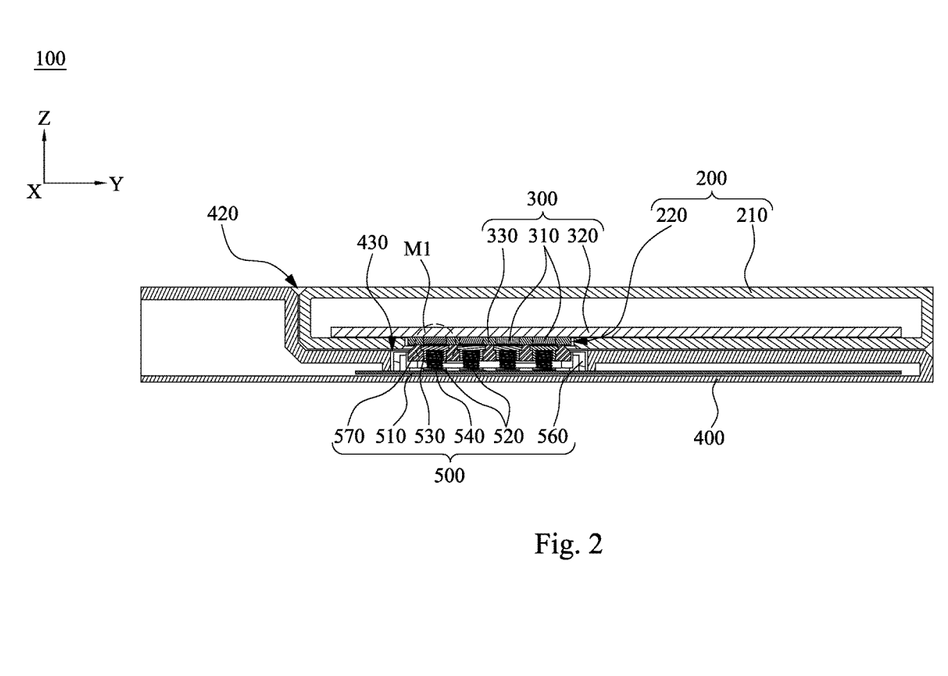
FIG. 2 is a cross sectional view of FIG. 1 taken along line A-A.
Figure 3:
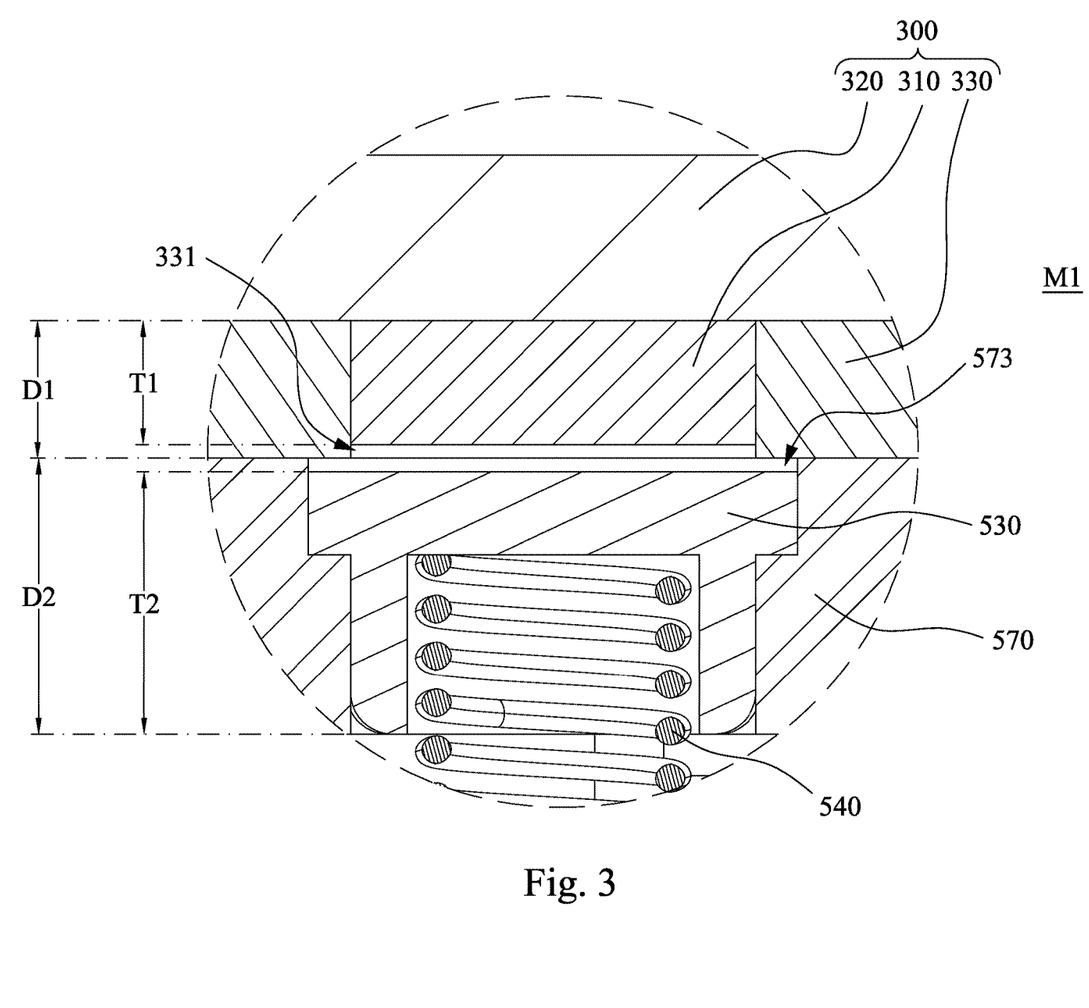
FIG. 3 is a partial enlarged view of a zone M1 of FIG. 2.

Reference is now made to FIG. 1 to FIG. 3 in which FIG. 1 is a perspective view of an electronic device with modulization parts according to an embodiment of this disclosure, FIG. 2 is a cross sectional view of FIG. 1 taken along line A-A, and FIG. 3 is a partial enlarged view of a zone M1 of FIG. 2. As shown in FIG. 1 to FIG. 3, the electronic device 100 with modulization parts includes a first main body 200, a first wireless transmission port 300, a second main body 400, and a second wireless transmission port 500. The first wireless transmission port 300 includes a plurality of first induction pads 310 and a first circuit board 320. The first circuit board 320 is disposed on the first main body 200. These first induction pads 310 are arranged on the first circuit board 320, and electrically connected to the first circuit board 320. The second main body 400 is detachably coupled to the first main body 200. The second wireless transmission port 500 includes a second circuit board 510, a plurality of second induction pads 520, a plurality of induction caps 530, and a plurality of elastic conductive members 540. The second circuit board 510 is disposed on the second main body 400. These second induction pads 520 are arranged on the second circuit board 510, and electrically connected to the second circuit board 510. Each of the elastic conductive members 540 is disposed between one of the second induction pads 520 and one of the induction caps 530, and is electrically conducted to the second induction pad 520 and the induction cap 530.

Thus, when the first main body 200 is coupled to the second main body 400, and the first wireless transmission port 300 aligns with the second wireless transmission port 500, as the elastic conductive members 540 physically supporting the induction caps 530, the induction cap 530 is closer to the first induction pads 310 than the second induction pads 520 so that each of the first induction pads 310 is allowed to contactlessly establish capacitive coupling with the corresponding second induction pad 520 through the induction cap 530 and the elastic conductive member 540 for the process of exchanging electrical signals between the first induction pad 310 and the second induction pad 520 so as to further improve the quality of signals of the first induction pad 310 and the second induction pad 520.

Therefore, no matter whether the dimensions of the first main body 200 and the second main body 400 are designed precisely, the aforementioned design of the electronic device 100 of the present disclosure can maintain the gap complying with the effective induction distance between the first induction pad 310 and the second induction pad 520 without additional processing costs and labor costs.

In great details, even if the dimensions of the first main body 200 and the second main body 400 are not designed precisely, for example, when the first main body 200 and the second main body 400 which have been coupled together are overly separated, in the embodiment of the electronic device 100, the induction cap 530 can be an extension of the corresponding second induction pad 520 so as to ensure that the second induction pad 520 can contactlessly establish capacitive coupling with the corresponding first induction pad 310; on the other hand, when the first main body 200 and the second main body 400 which have been coupled together are overly closed, in the embodiment of the electronic device 100, since the elastic conductive member 540 will be compressed to give room for the corresponding first induction pad 310 so that the second induction pad 520 is still allowed to contactlessly establish capacitive coupling with the corresponding first induction pad 310 through the corresponding induction cap 530.

Figure 4:
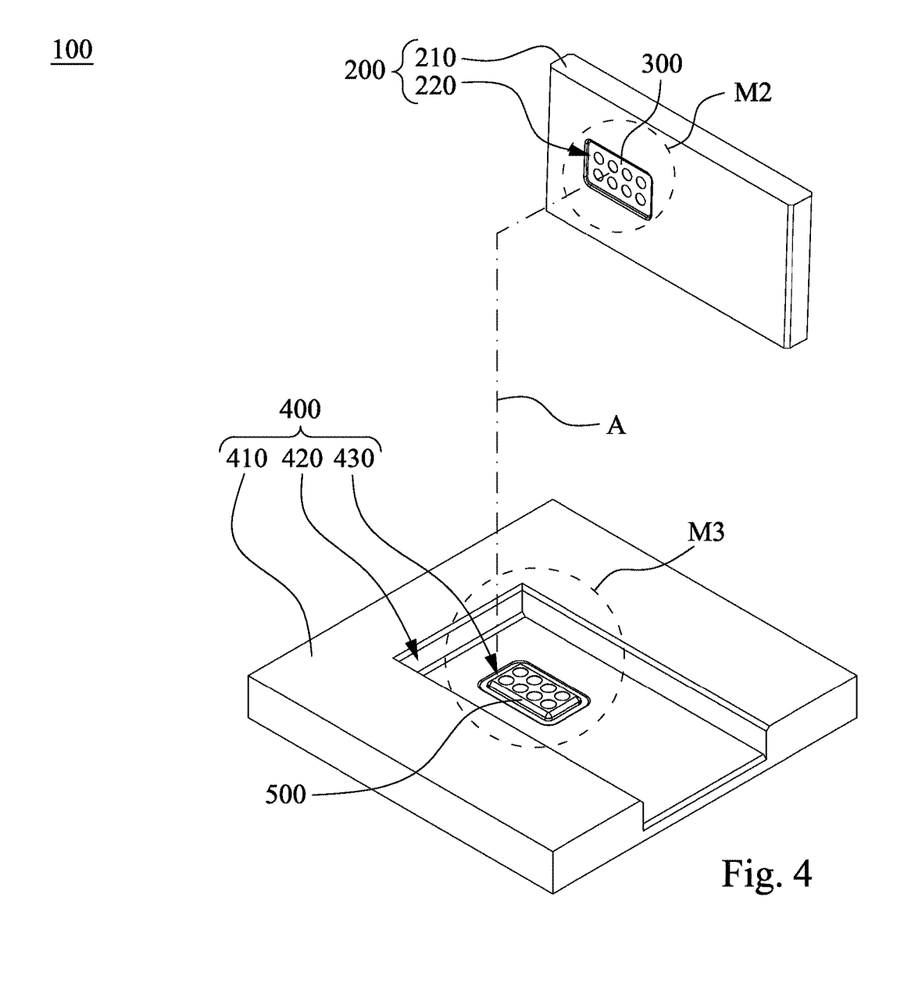
FIG. 4 is an exploded view of FIG. 1.

FIG. 4 is an exploded view of FIG. 1. In this embodiment, as shown in FIG. 2 and FIG. 4, the second main body 400 is a mainframe machine of the electronic device 100, as the largest part of the electronic device 100. The mainframe machine at least includes a main-board and a central processing unit. The first main body 200 is a detachable module in the electronic device 100. The detachable module for example can be a removable network card, a removable graphic process module, a removable storage module or a removable sound module. Specifically, the first main body 200 includes a first hard case 210 and a first recess portion 220 formed on one surface of the first hard case 210. The first wireless transmission port 300 is disposed in the first recess portion 220. The second main body 400 includes a second hard case 410, a second recess portion 420 and an accommodation space 430. The second recess portion 420 is formed on one surface of the second hard case 410. The accommodation space 430 is formed on a bottom surface of the second recess portion 420, and the accommodation space 430 exposes out these second induction pads 520 and a part of the second circuit board 510. The second wireless transmission port 500 is disposed in the second recess portion 430.

Thus, when the first main body 200 is going to be coupled to the second main body 400, the first hard case 210 moves into the second recess portion 420 in a normal-line direction A (see Z-axis, FIG. 4) of the bottom surface of the second recess portion 420, and the first hard case 210 is fixed in the second recess portion 420 so that the first wireless transmission port 300 exactly aligns with the second wireless transmission port 500 at the same time (FIG. 2)

Figure 5A:
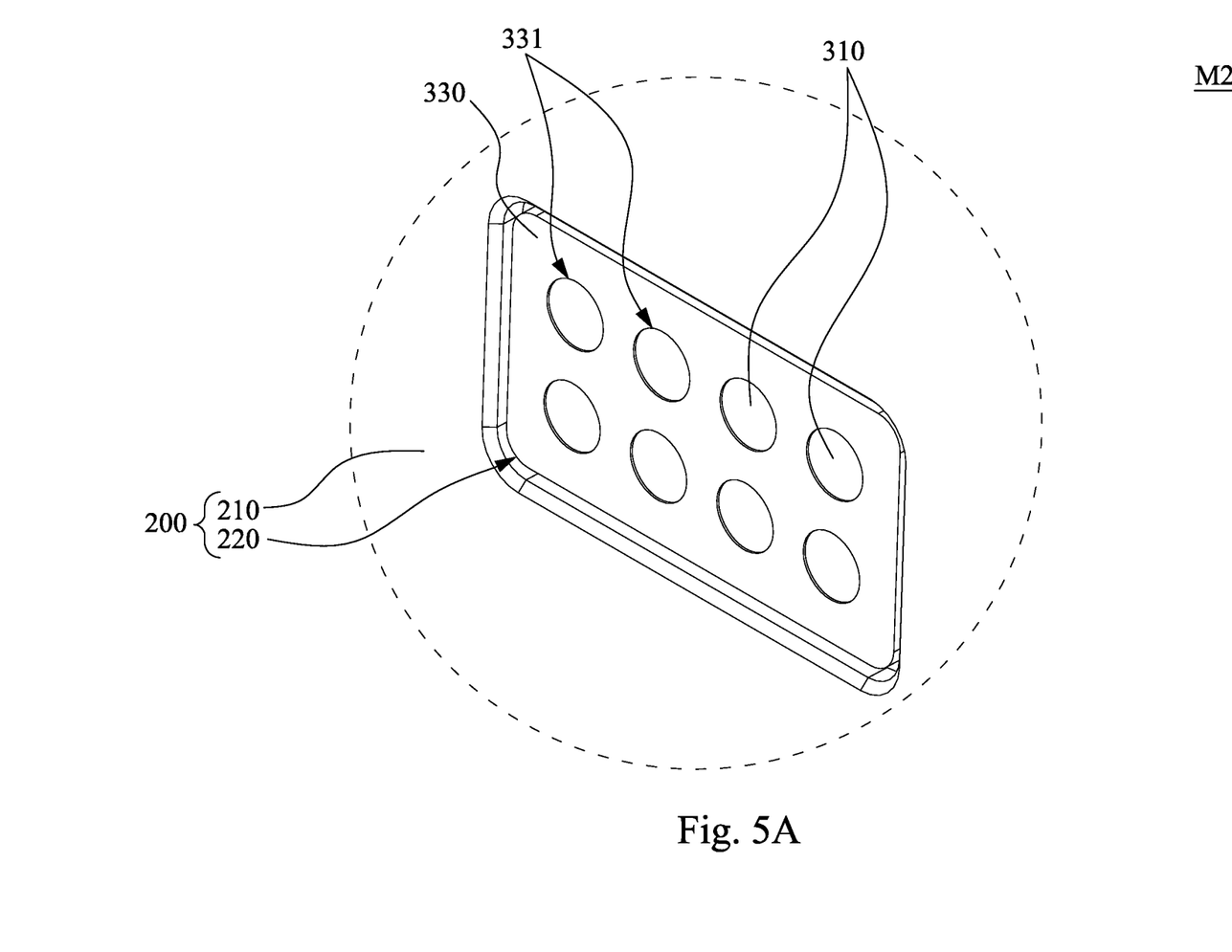
FIG. 5A is a partial enlarged view of a zone M2 of FIG. 4.

FIG. 5A is a partial enlarged view of a zone M2 of FIG. 4. As shown in FIG. 4 and FIG. 5A, specifically, in the embodiment, the first wireless transmission port 300 further includes a partition board 330. The partition board 330 is flat disposed in the first recess portion 220, and disposed on the first circuit board 320 (FIG. 2). The partition board 330 includes a plurality of first penetrating holes 331 formed thereon. These first induction pads 310 are received and depressed in the first penetrating holes 331 (FIG. 3), respectively, so that these first induction pads 310 are separated with each other.

Figure 5B:
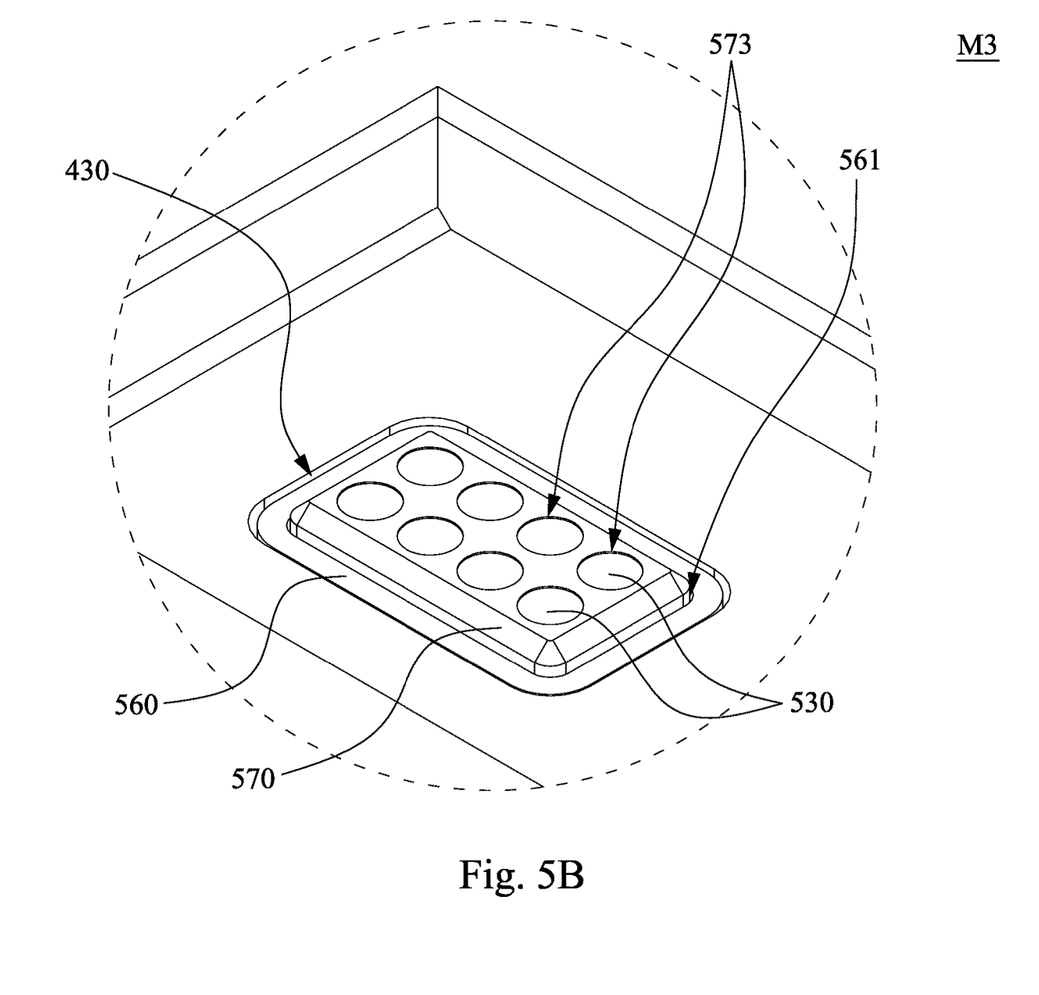
FIG. 5B is a partial enlarged view of a zone M3 of FIG. 4.

FIG. 5B is a partial enlarged view of a zone M3 of FIG. 4. As shown in FIG. 2 and FIG. 5B, the second wireless transmission port 500 further includes a frame 560 and a floatable platform 570. The frame 560 is fixedly disposed on the second main body 400, for example, the frame 560 is installed in the accommodation space 430. The frame 560 is provided with an opening 561 capable of exposing the second induction pad 520 outwardly before the floatable platform 570 covers the opening 561. The floatable platform 570 is flat disposed in the opening 561, and is elevatably disposed in the opening 561. The floatable platform 570 includes a plurality of second penetrating holes 573 formed thereon. These induction caps 530 are received and depressed in the second penetrating holes 573, respectively. Each of the induction caps 530 is engaged inside the corresponding second penetrating hole 573.

Thus, when the first hard case 210 moves into the second recess portion 420, the partition board 330 is in contact with the floatable platform 570 first, and the partition board 330 then presses the floatable platform 570 to press these the induction caps 530 independently, thus, each of the induction caps 530 can press the corresponding elastic conductive member 540 so that the floatable platform 570 can cooperatively give room as the elastic conductive members 540 are inconsistently pressed in accordance with inconsistent thicknesses of the partition board 330. Oppositely, when the first main body 200 is released from the second main body 400, the elastic conductive members 540 restore to lift the induction caps 530 and the floatable platform 570 back to the original position before the elastic conductive members 540 are pressed.

It is noted, since the induction caps and the corresponding elastic conductive members 540 are independently disposed in the opening, respectively, and the confronted surfaces of the floatable platform and the partition board do not have to be in parallel absolutely. Thus, when the partition board contacts with the floatable platform, the partition board might unevenly press the floatable platform to cause the floatable platform tilt, that is, the floatable platform might not descend horizontally in the opening. Thus, for fitting the outline of the partition board, the floatable platform can press a part of the induction caps 530 only with pressures in connection to the contacting condition between the floatable platform and the partition board, so as to maintain the effective induction distance being required between each second induction pad and the corresponding first induction pad.

Also, in greater details, as shown in FIG. 3, since the first penetrating hole 331 includes a first depth D1, and the first induction pad 310 includes a first thickness T1 less than the first depth D1. Thus, the first induction pad 310 is received and depressed in the first penetrating hole 331, rather than protruding outwards from the first penetrating hole 331. Similarly, the second penetrating hole 573 includes a second depth D2, and the induction cap 530 includes a second thickness T2 less than the second depth D2. Thus, the induction cap 530 is received and depressed in the second penetrating hole 573, rather than protruding outwards from the second penetrating hole 573. Thus, when the partition board 330 contacts with the floatable platform 570, since the first induction pad 310 is received and depressed in the first penetrating hole 331, and the induction cap 530 is received and depressed in the second penetrating hole 573, the first induction pad 310 is not physically contacted with the induction cap 530 which aligns with the first induction pad 310 so that abrasion generating between the first induction pad 310 and the induction cap 530 can be avoided, and the problems of the product life being decreased and the maintenance cost being increased will not be happened.

It is noted, refer to FIG. 2, in this embodiment, when the first wireless transmission port 300 aligns with the second wireless transmission port 500, a perpendicular orthographic of each of the first induction pads 310 towards the floatable platform 570 is substantially completely overlapped with the top surface of the corresponding induction cap 530. Thus, each of the first induction pads 310 can contactlessly establish capacitive coupling with the corresponding second induction pad 520 through the induction cap 530. However, the disclosure is not limited thereto, in another embodiment, a perpendicular orthographic of each of the first induction pads 310 towards the floatable platform 570 is at least partially overlapped with the top surface of the corresponding induction cap 530 so that each of the first induction pads 310 can contactlessly establish capacitive coupling with the corresponding induction cap 530.

Figure 6A:
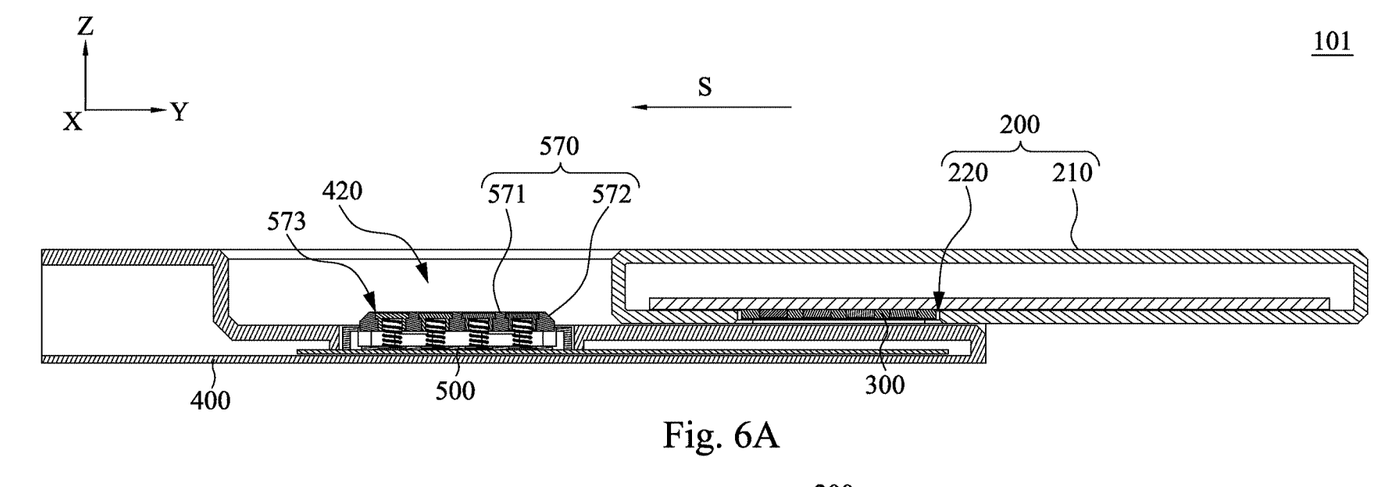
FIG. 6A-FIG. 6B are combination schematic views of an electronic device with modulization parts according to another embodiment of this disclosure.
Figure 6B:
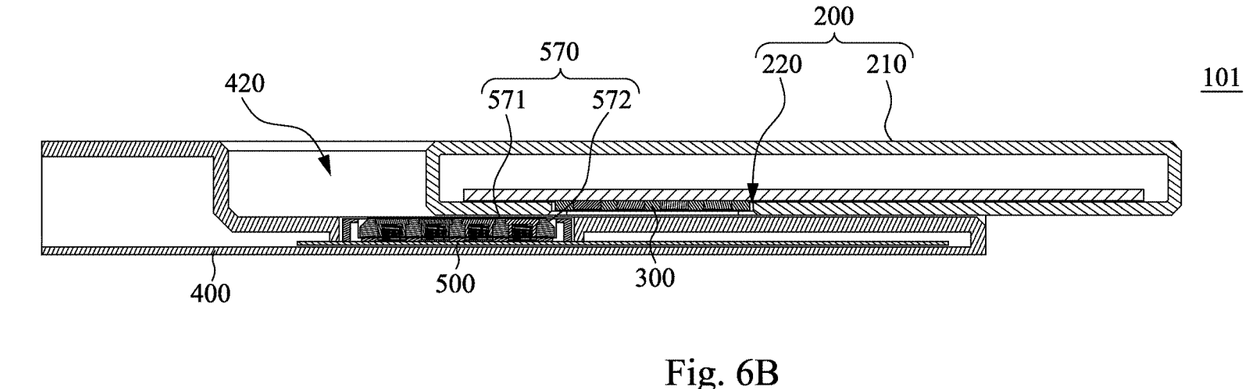

FIG. 6A-FIG. 6B are combination schematic views of an electronic device with modulization parts according to another embodiment of this disclosure. The electronic device 101 shown in the FIG. 6A is substantially the same to the electronic device 100 shown in the FIG. 4, except that the first main body 200 of FIG. 4 is vertically combined to the second main body 400, and the first main body 200 of FIG. 6A is laterally combined to the second main body 400 horizontally. The first hard case 210 enters into the second recess portion 420 in a lateral direction S (refer to Y-axis), and is fixed in the second recess portion 420. At the meantime, the lateral direction S is perpendicular to a normal line A (refer to Z-axis) of the bottom surface of the second recess portion 420. Also, the second recess portion 420 is concavely formed on both of two adjacent surfaces of the second hard case 410 (FIG. 4).

In this embodiment, in order to have the first wireless transmission port 300 to smoothly align with the second wireless transmission port 500 as the first hard case 210 enters into the second recess portion 420, as shown in FIG. 5B, the floatable platform 570 includes a top surface 571 and at least one guiding surface 572. The guiding surface 572 is connected to the top surface 571, and the guiding surface 572 for example can be an inclined surface. The second penetrating holes 573 are formed on the top surface 571 of the floatable platform 570. Thus, when the first hard case 210 enters into the second recess portion 420, the first main body 210 can be guided to smoothly ride onto the top surface 572 of the floatable platform 570 by the guiding surface 572 so as to achieve that the partition board 330 contacts with the top surface 572 of the floatable platform 570. Therefore, the first wireless transmission port 300 can be smoothly aligned with the second wireless transmission port 500. However, the disclosure is not limited thereto, in another embodiment, the guiding surface 572 also can be an arc surface.

In all of the aforementioned embodiments, as shown in FIG. 2, the elastic conductive member 540 is a retractable spring. One end of the elastic conductive member 540 is connected to one of the second induction pads 520, and the other end of the elastic conductive member 540 is connected to one of the induction caps 530 so that the long direction (refer to Z-axis) of the retractable spring is in parallel with the normal line A (refer to Z-axis) of the bottom surface of the second recess portion 420. More particularly, the end of the elastic conductive member 540, for example, is soldered on the corresponding second induction pads 520, the other end of the elastic conductive member 540 is engaged within the corresponding induction cap 530. Accordingly, the other end of the elastic conductive member 540 will not easily release from the corresponding induction caps 530.

Figure 7:
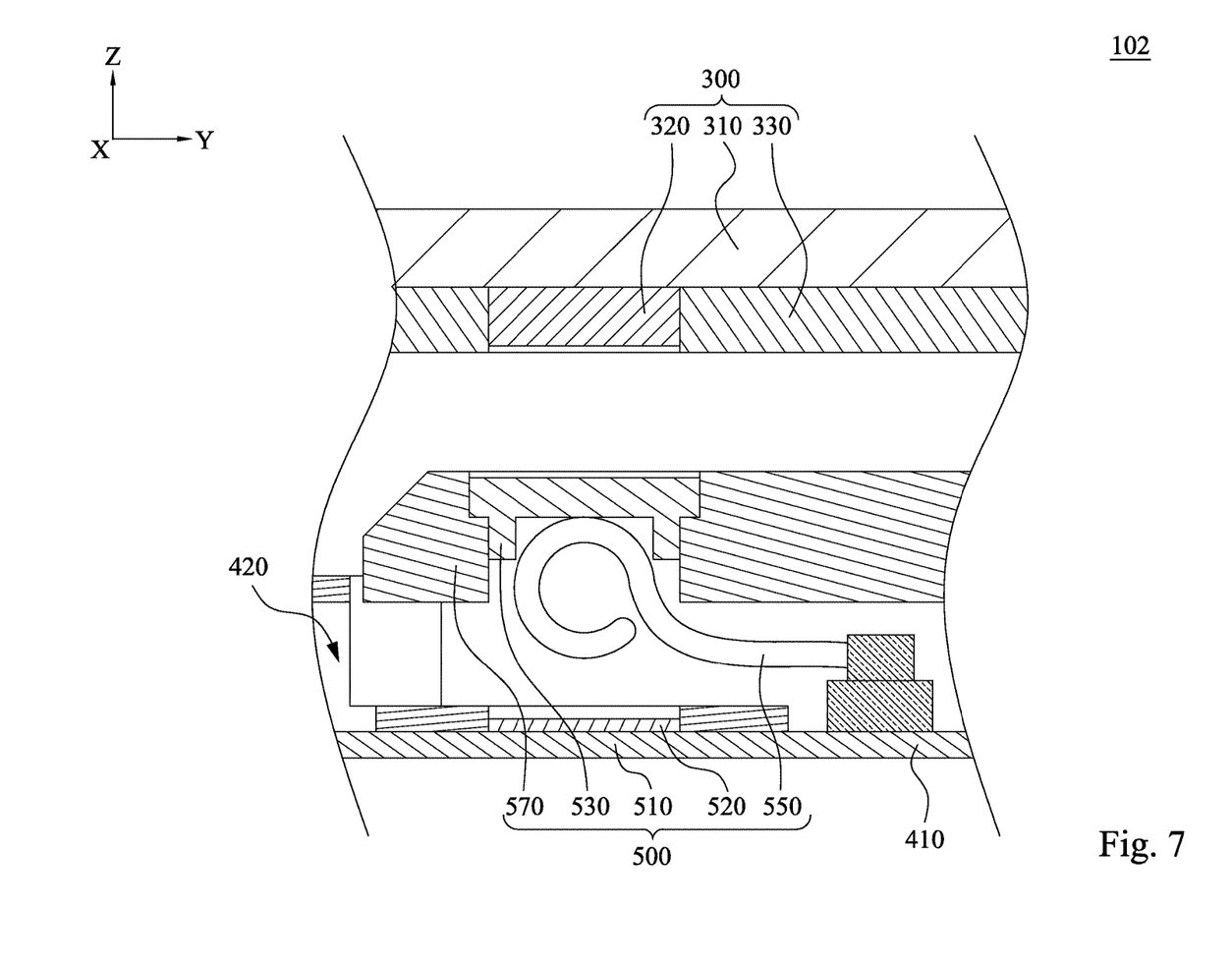
FIG. 7 is a partial schematic view of an elastic conductive member of an electronic device with modulization parts according to another embodiment of this disclosure.

FIG. 7 is a partial schematic view of an elastic conductive member 550 of an electronic device 102 with modulization parts according to another embodiment of this disclosure. As shown in FIG. 7, the electronic device 102 of the embodiment of the disclosure is substantially the same with the electronic device 100 in FIG. 2, except that the elastic conductive member 550 is a flat-arm metal spring in which one end of the flat-arm metal spring is fixedly connected to the second hard case 410, and the other end of the flat-arm metal spring is a free-end and is held by the induction cap 530, so the extending direction of the flat-arm metal spring is perpendicular to the normal line A (refer to Z-axis) of the bottom surface of the second recess portion 420 (FIG. 4).

Thus, when the first hard case 210 enters into the second recess portion 420, and the partition board 330 presses the induction cap 530 through the floatable platform 570, the induction cap 530 presses the corresponding flat-arm metal spring so that the other end of the flat-arm metal spring being opposite to the induction cap 530 is closed to, or even contacts with the second induction pad 520 so that the first induction pad 310 can contactlessly establish capacitive coupling with the corresponding second induction pad 520 through the induction cap 530.

Although the first main body described in the embodiment above is a detachable module in the electronic device, and the second main body is a mainframe machine of the electronic device. However, the disclosure is not limited thereto, in other embodiments, the first main body and the second main body may swappable with each other in which the first main body is a mainframe machine of the electronic device, and the second main body is a detachable module of the electronic device. Furthermore, the types of the electronic device of the disclosure are not limited thereto, for example, the electronic device can be a smart phone, a notebook computer or a global positioning system (GPS) device.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An electronic device with modulization parts, comprising: a first main body;
a first wireless transmission port comprising:
a first circuit board disposed on the first main body; and
at least one first induction pad electrically connected to the first circuit board;
a second main body detachably coupled to the first main body; and
a second wireless transmission port comprising:
a second circuit board disposed on the second main body; at least one second induction pad electrically connected to the second circuit board; at least one induction cap; and
at least one elastic conductive member electrically conducted to the second induction pad and the induction cap,
wherein, when the first main body is coupled to the second main body, and the first wireless transmission port aligns with the second wireless transmission port, the elastic conductive member physically supports the induction cap, such that the first induction pad induces the second induction pad through the induction cap.

2. The electronic device with modulization parts of claim 1, wherein the first wireless transmission port further comprises a partition board that is disposed on the first circuit board and comprises at least one first penetrating hole, wherein the first induction pad is received and depressed in the first penetrating hole.

3. The electronic device with modulization parts of claim 2, wherein the second wireless transmission port further comprises:
a frame fixedly disposed on the second main body, and comprising an opening exposing the second induction pad; and
a floatable platform elevatably disposed in the opening, and comprising at least one second penetrating hole, wherein the induction cap is received and depressed in the second penetrating hole.

4. The electronic device with modulization parts of claim 3, wherein the first penetrating hole comprises a first depth, and the first induction pad comprises a first thickness less than the first depth; and
the second penetrating hole comprises a second depth, and the induction cap comprises a second thickness less than the second depth.

5. The electronic device with modulization parts of claim 3, wherein the floatable platform comprises:
a top surface for contacting with the partition board; and
a guiding surface connected to the top surface for guiding the first main body to reach the top surface.

6. The electronic device with modulization parts of claim 3, wherein, when the first wireless transmission port aligns with the second wireless transmission port, a perpendicular orthographic of the first induction pad towards the floatable platform is at least partially overlapped with the induction cap.

7. The electronic device with modulization parts of claim 1, wherein the elastic conductive member is a retractable spring, and two opposite ends of the retractable spring are respectively connected to the second induction pad and the induction cap.

8. The electronic device with modulization parts of claim 1, wherein the elastic conductive member is a flat-arm metal spring, and two opposite ends of the flat-arm metal spring are respectively connected to the second main body and the induction cap.

* * * * *